United States Patent [19]
Diesch

[11] Patent Number: 5,230,414
[45] Date of Patent: Jul. 27, 1993

[54] COUPLING ASSEMBLY COMPONENT

[75] Inventor: Ronald W. Diesch, Lodi, Ohio

[73] Assignee: Eaton Corporation, Cleveland, Ohio

[21] Appl. No.: 918,639

[22] Filed: Jul. 21, 1992

[51] Int. Cl.$^5$ ............................................. F16D 25/04
[52] U.S. Cl. ............................. 192/88 B; 192/85 AT; 188/366; 92/91
[58] Field of Search ............. 192/85 AT, 88 B, 88 R; 188/366, 367; 152/512, 523; 156/87; 92/90, 91

[56] References Cited

U.S. PATENT DOCUMENTS

| | | | |
|---|---|---|---|
| 2,165,185 | 7/1939 | Suris | 192/88 B |
| 2,237,864 | 4/1941 | Fawick | 192/88 B |
| 2,330,368 | 9/1943 | Judson | 188/367 |
| 2,630,198 | 3/1953 | Kraft | 192/88 B |
| 2,770,282 | 11/1956 | Herzegh | 156/87 X |
| 2,973,799 | 3/1961 | Kelly | 156/87 X |
| 3,075,624 | 1/1963 | Fawick | 192/88 B |
| 3,835,907 | 9/1974 | Bishton | 152/523 X |
| 4,022,114 | 5/1977 | Hansen, III et al. | 156/87 X |
| 5,057,178 | 10/1991 | Latsko | 156/245 |
| 5,086,899 | 2/1992 | Latsko | 192/88 B |

Primary Examiner—Richard M. Lorence
Attorney, Agent, or Firm—Tarolli, Sundheim & Covell

[57] ABSTRACT

A coupling assembly component is used in a coupling assembly to transmit force between driving and driven elements. The coupling assembly component includes an annular tube which is radially extensible and retractable to move a friction surface into and out of engagement with another coupling component. The tube includes a reinforcing layer which is enclosed by a cover layer. A plurality of vent openings are formed in and extend through the cover layer to the reinforcing layer. In one embodiment of the invention, the vent openings are formed in bodies of porous polymeric material disposed in the cover layer. The bodies of porous polymeric material have an inner side exposed to the reinforcing layer and an outer side which is exposed to the atmosphere around the tube. In another embodiment of the invention, vent valves are provided to enable fluid to flow outwardly from the reinforcing layer through the cover layer to the atmosphere around the tube and to prevent contaminants from flowing inwardly from the atmosphere around the tube.

30 Claims, 2 Drawing Sheets

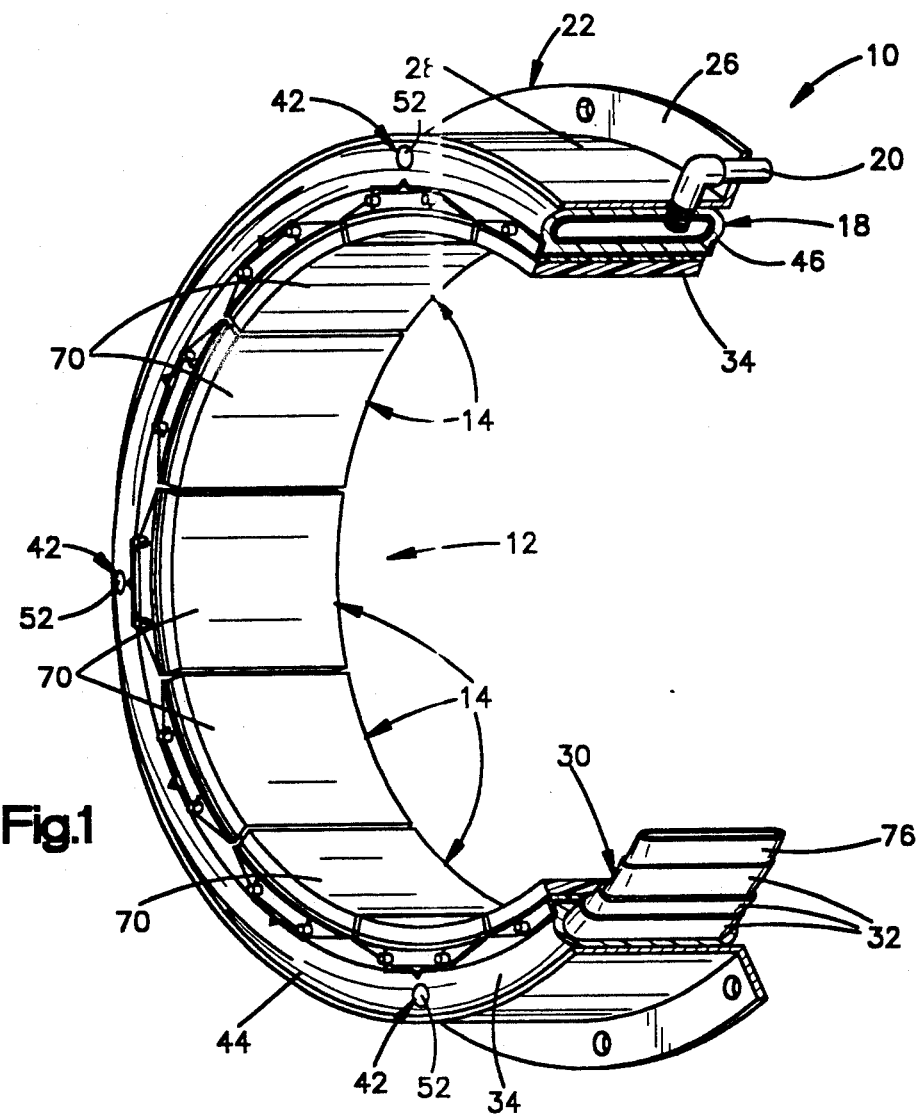
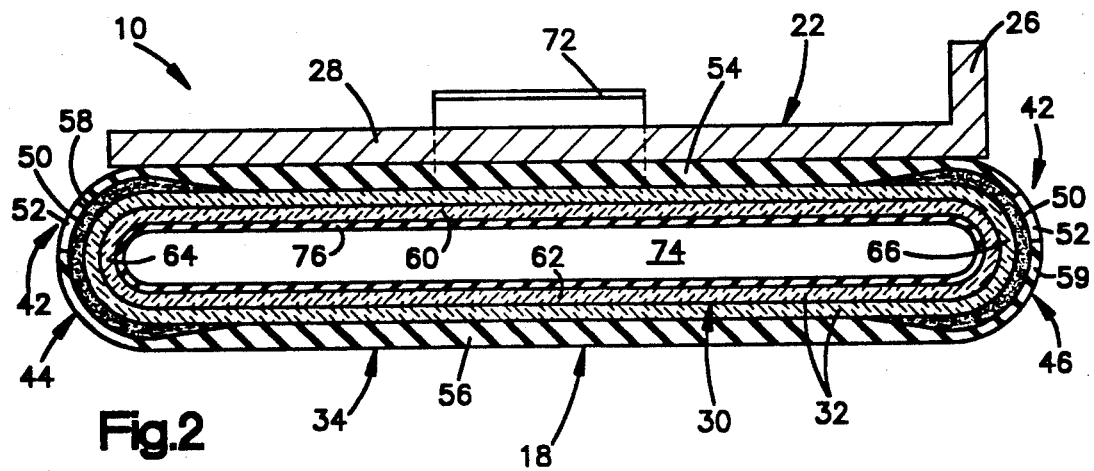

COUPLING ASSEMBLY COMPONENT

BACKGROUND OF THE INVENTION

The present invention relates to an improved component for a coupling assembly in which a tube is extended and retracted to move a friction surface into and out of engagement with another component of the coupling assembly.

Known coupling assemblies, such as a brake or clutch, include a component having an inflatable annular tube which is mounted on a rigid annular rim. An annular array of friction shoe assemblies is connected with the tube. When fluid pressure is sequentially conducted into and out of the tube, the tube is sequentially extended and retracted to engage the friction shoe assemblies with another coupling assembly component and to disengage the friction shoe assemblies from the other coupling assembly component. Coupling assembly components having this general construction and mode of operation are disclosed in U.S. Pat. Nos. 4,795,013; 5,057,178; 5,086,899; and 5,117,957.

During use of coupling assembly components having this construction for relatively long periods of time at elevated temperatures and/or pressures, voids or bubbles may tend to develop between a fabric reinforcing layer and an elastomeric outer cover layer forming the tube. If the bubble ruptures, contaminants from the operating environment can enter the tube through the rupture with a resulting degradation of the tube. Whether or not the bubble ruptures, friction shoes adjacent to effected areas may not retract properly. This can lead to overheating and eventual failure of the coupling assembly component.

Based on field observation, inspection of used tubes, and laboratory testing, it is believed that the formation of bubbles or voids in the tube is the result of air migrating through elastomeric material of an inner layer of the tube and becoming trapped in the fabric reinforcing layer. It is believed that the air pressure between the reinforcing layer and the outer cover layer may exceed 70 lbs/sq. inch (gauge). When there is anything less than an optimum bond between the cover layer and the reinforcing layer, air pressure in the reinforcing layer is sufficient to cause a bubble to form between the reinforcing layer and the cover layer.

SUMMARY OF THE INVENTION

The present invention provides a new and improved component for use in a coupling assembly to transmit force between first and second elements. The coupling assembly component includes an annular tube which is radially extensible and retractable in response to the conducting of fluid pressure into and out of the tube. This moves a first friction surface into and out of engagement with a second friction surface. The tube includes a reinforcing layer and a cover layer. The cover layer is formed of an elastomeric material and extends around the reinforcing layer.

In accordance with a feature of the invention, a plurality of vent openings extend through the cover layer to the reinforcing layer. In one embodiment of the invention, the vent openings are at least partially formed in a porous polymeric material. In another embodiment of the invention, vent valves are associated with the vent openings. Each of the vent valves is operable between a closed condition blocking fluid flow through the vent openings and an open condition enabling fluid to flow through the vent openings.

BRIEF DESCRIPTION OF THE DRAWINGS

The foregoing and other features of the present invention will become more apparent upon a consideration of the following description taken in connection with the accompanying drawings wherein:

FIG. 1 is a partially broken away pictorial illustration of a coupling assembly component constructed in accordance with the present invention and illustrating the relationship between an annular rim, an improved annular tube, and an annular array of friction shoe assemblies which are connected with the tube;

FIG. 2 is a simplified radial sectional view through a portion of the tube with the friction shoe assemblies removed;

DESCRIPTION OF SPECIFIC PREFERRED EMBODIMENTS OF THE INVENTION

Coupling Assembly Component

Figure 3:
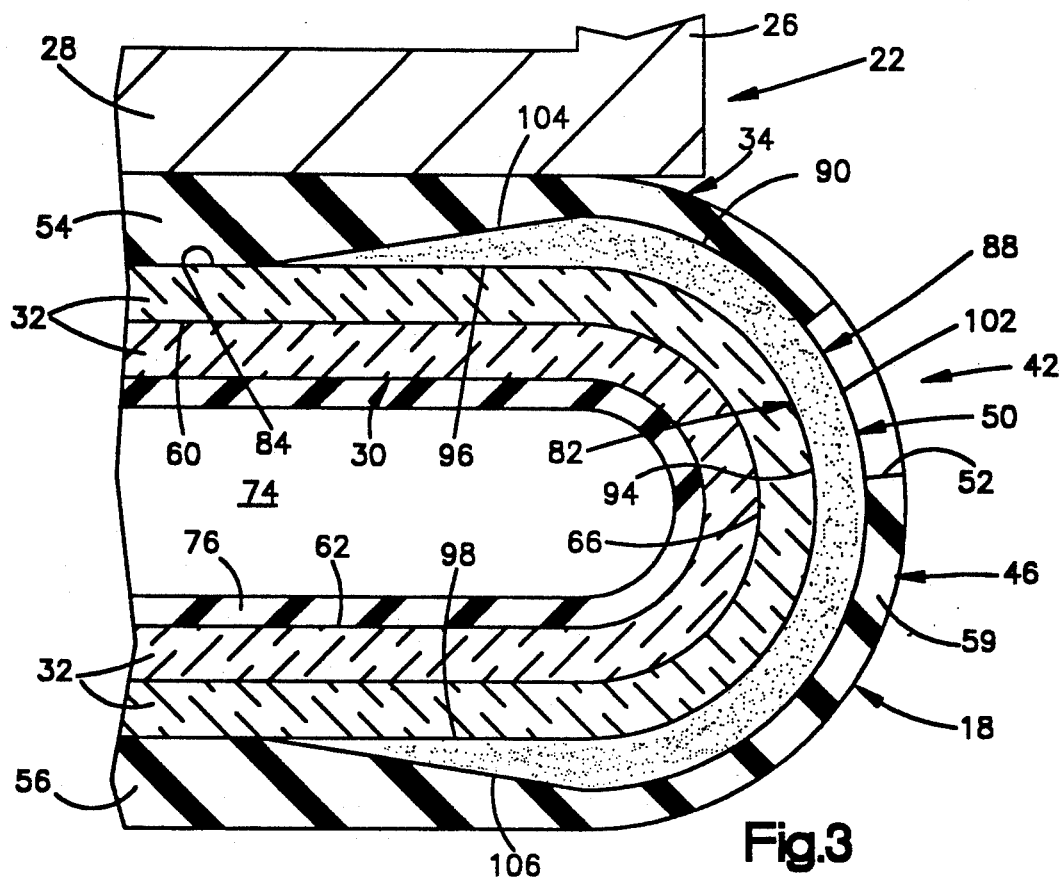
FIG. 3 is an enlarged fragmentary view of a portion of the tube of FIG. 2 and illustrating the manner in which a porous body of polymeric material is disposed between a reinforcing layer and a cover layer of the tube.

A coupling assembly component 10 constructed in accordance with the present invention is illustrated in FIG. 1 and includes a circular array 12 of friction shoe assemblies 14. The friction shoe assemblies 14 are engageable with a cylindrical friction surface on the outside of a drum or other coupling assembly component (not shown) to interconnect the two coupling assembly components. The coupling assembly component 10 could function as either a brake or a clutch.

The friction shoe assemblies 14 are moved into engagement with the cylindrical friction surface on the drum by radial expansion of an improved inflatable tube 18. Thus, when fluid pressure, such as air pressure, is conducted through a conduit 20 to the annular tube 18, the tube expands radially inwardly. This causes the tube 18 to press the friction shoe assemblies 14 against the drum. The friction between the shoe assemblies 14 and the drum interconnects the drum and the coupling assembly component 10.

A rigid annular metal rim 22 is connected with the inflatable tube 18. The rim 22 has an annular mounting flange 26 which is used to connect the coupling assembly component 10 with an associated apparatus. The rim 22 has a cylindrical web 28 with a radially inner side surface which is bonded to a radially outer portion of the tube 18.

Upon inflation of the tube 18 to press the friction shoe assemblies 14 against a drum or other coupling component, torque is transmitted between the friction shoe assemblies and the rim 22. In order to enable the tube 18 to withstand relatively large torque forces, a reinforcing layer 30 is provided in the tube. The reinforcing layer 30 includes a plurality of reinforcing plies 32. The reinforcing plies 32 are formed of fabric and are surrounded by a cover layer 34 formed of elastomeric material, such as either natural or synthetic rubber.

In the illustrated embodiment of the coupling assembly component 10, the tube 18 is expanded radially inwardly to press the friction shoe assemblies 14 against a cylindrical outer side surface of a drum. However, it is contemplated that a tube, having the same general construction as the tube 18, could be expanded radially outwardly to press friction shoe assemblies against a cylindrical inside surface of a hollow drum or other coupling assembly component. It is also contemplated that the friction shoe assemblies 14 could be moved into engagement with the drum by springs and moved out of engagement with the drum by inflation of the tube, in a manner similar to that disclosed in U.S. Pat. No. 5,117,957.

The general construction and mode of operation of the illustrated coupling assembling component 10 is the same as is disclosed in U.S. Pat. No. 5,057,178. Therefore, the general construction of the coupling assembly component 10 and its general mode of operation will not be further described herein in order to avoid prolixity of description. However, it should be understood that the coupling assembly component 10 could have a construction which is different from the construction illustrated in FIG. 1.

Inflatable Tube

In accordance with a feature of the present invention, a plurality of vent openings 42 (FIGS. 1 and 2) are formed in annular side walls 44 and 46 of the tube 18. The vent openings 42 relieve fluid pressure within the reinforcing layer 30. Thus, the vent openings 42 enable fluid pressure to be conducted from the reinforcing layer 30 to the atmosphere around the tube 18.

In the embodiment of the invention illustrated in FIG. 2, the vent openings 42 are formed by bodies 50 of porous polymeric material and openings 52 in the cover layer 34. The fluid permeable bodies 50 of porous polymeric material are disposed between the cover layer 34 and the reinforcing layer 32. Circular openings 52 through the cover layer enable fluid (air) to flow from the bodies 50 of polymeric material to the atmosphere. Thus, fluid (air) flows from the fabric material of the reinforcing layer 30 into the small openings (pores) in the bodies 50 of porous polymeric material. The fluid (air) flows from the bodies 50 of porous polymeric material through the relatively large circular openings 52 in the cover layer 34 to the atmosphere around the tube 18.

The identical bodies 50 of porous polymeric material have a generally square configuration and are disposed at four equally spaced locations along each of the side walls 44 and 46 of the tube 18. Thus, there are four bodies 50 of porous polymeric material disposed in the annular side wall 44 of the tube 18. Similarly, there are four bodies 50 of porous polymeric material disposed in the opposite annular side wall 46 of the tube 18.

The one-piece, elastomeric cover layer 34 of the tube 18 includes a generally cylindrical radially outer portion 54 (FIG. 2) which is bonded to the web 28 of the rim 22. The cover layer 34 also includes a generally cylindrical radially inner portion 56 which is releasably connected with the friction shoe assemblies 14 (FIG. 1). The radially outer and inner portions 54 and 56 (FIG. 2) of the cover layer 34 are molded, in a known manner, as one piece with annular side wall portions 58 and 59 of the cover layer.

The reinforcing layer 30 (FIG. 2) includes a generally cylindrical radially outer portion 60 which is disposed radially inwardly of and is bonded to the radially outer portion 54 of the cover layer 34. The reinforcing layer 30 also includes a generally cylindrical radially inner portion 62 which is disposed radially outwardly of and is bonded to the radially inner portion 56 of the cover layer 34. The reinforcing layer 30 includes annular side wall portions 64 and 66 which are disposed axially inwardly of the side wall portions 58 and 59 of the cover layer 34. At locations where the bodies 50 of porous polymeric material are not present in the side walls 44 and 46 of the tube 18, the side wall portions 64 and 66 of the reinforcing layer 30 are bonded to the side wall portions 58 and 59 of the cover layer 34.

The tube 18 is expanded radially inwardly to move arcuate friction surfaces 70 (FIG. 1) on the friction shoe assemblies 14 into engagement with a cylindrical surface on a drum or other coupling element. To expand the tube, air under pressure is conducted to the tube 18 through a fitting 72 (FIG. 2). The fitting 72 is connected in fluid communication with an annular chamber 74 disposed within the tube 18.

Air pressure within the chamber 74 is applied against an annular inner layer 76 of the tube 18. The annular inner layer 76 completely covers and is bonded to the inside of the reinforcing layer 30. Therefore, the air pressure in the chamber 74 is applied against the inner layer 76 to move the reinforcing layer 30 and cover layer 34 radially inwardly. This moves the friction shoes 14 in the annular array 12 (FIG. 1) radially inwardly to engage the drum or other coupling element.

When the coupling is engaged for a relatively long period of time with relatively high fluid pressures in the chamber 74, it has been found that air tends to migrate through the elastomeric material (Neoprene) of the inner layer 76 to the fabric material of the reinforcing layer 30. In accordance with a feature of the invention, a build-up of fluid pressure in the reinforcing layer 30 and the formation of bubbles between the reinforcing layer and the cover layer 34 is prevented by venting the fluid pressure in the reinforcing layer 30. The fluid pressure in the reinforcing layer 30 is vented to the atmosphere through the vent openings 42.

Laboratory tests were conducted on a known coupling assembly component having the same general construction as the coupling assembly component 10, except that tube did not have the vent openings 42. After being engaged with a fluid pressure of approximately 150 lbs/sq. inch (gauge) for a period of approximately 1,200 hours before releasing, the internal pressure in the reinforcing layer 30 of the known coupling assembly component exceeded 70 lbs/sq. inch (gauge). However, when the coupling assembly component 10 having the improved tube 18 with the vent openings 42, was engaged with a pressure of approximately 150 lbs/sq. inch (gauge) for period of approximately 1,200 hours before releasing, the internal pressure in the reinforcing layer 30 did not exceed 16 lbs/sq. inch (gauge).

The manner in which the body 50 of porous polymeric material is mounted in the side wall 46 between the reinforcing layer 30 and the cover layer 34 is illustrated in FIG. 3. The square body 50 of porous polymeric material has an inner side surface 82 which is disposed in abutting engagement with an outer side surface 84 of an outer ply 32 of the reinforcing layer 30. An outer side surface 88 of the body 50 of porous polymeric material is disposed in abutting engagement with an inner side surface 90 of the cover layer 34. In addition, the outer side surface 88 of the body 50 of porous polymeric material extends across the openings 52 formed in the cover layer 34. By spanning the opening 52 in the cover layer 34, the body 50 of porous polymeric material prevents exposure of the fabric plies 32 of the reinforcing layer 30 to contaminants from the environment around the tube 18.

Although only one of the bodies 50 of porous polymeric material has been shown in FIG. 3, it should be understood that the other bodies of porous polymeric material are mounted in the side wall 46 in the same manner as shown in FIG. 3. It should also be understood that the bodies 50 of porous polymeric material in the side wall 44 are mounted in the same manner as shown in FIG. 3 for the side wall 46.

When fluid pressure tends to build-up in the reinforcing layer 30, fluid (air) is conducted into the body 50 of porous polymeric material throughout the area of engagement of the inner side surface 82 of body of porous polymeric material with the outer side surface 84 of the reinforcing layer. The relatively large area of engagement of the fluid permeable body 50 of porous polymeric material with the reinforcing layer 30 facilitates the flow of fluid from the reinforcing layer into the body of porous polymeric material. The fluid can flow sidewardly through the body 50 of porous polymeric material to the opening 52 and can then flow outwardly through the opening. Since it is relatively easy for fluid to enter the body 50 of porous polymeric material at a relatively large area on the surface 84 of the reinforcing layer 30, the fluid pressure which can build-up in the reinforcing layer tends to be minimized.

There are four bodies 50 of porous polymeric material located at evenly spaced apart locations along the side wall 46 of the tube 18. However, fluid (air) will migrate along the fabric material of the reinforcing plies 32 to the spaced apart locations where the bodies 50 of porous polymeric material are located. If desired, the area of engagement of the bodies 50 of porous polymeric material with the reinforcing layer 30 could be increased to further facilitate the flow of fluid from the reinforcing layer to the bodies of porous polymeric material.

The continuous inner side surface 82 (FIG. 3) of the body 50 of porous polymeric material includes an arcuately curving portion 94 which is disposed in the side wall 46 of the tube 18 in engagement with the side wall portion 66 of the reinforcing layer 30. An axially extending radially outer portion 96 of the inner side surface 82 of the body 50 of porous polymeric material is disposed in engagement with the cylindrical radially outer portion 60 of the reinforcing layer 30. Similarly, an axially extending radially inner portion 98 of the inner side surface 82 of the body 50 of porous polymeric material is disposed in engagement with the cylindrical radially inner portion 62 of the reinforcing layer 30. The inner side surface 82 of the body 50 of porous polymeric material is firmly bonded to an outer ply 32 of the reinforcing layer 30 to securely interconnect the reinforcing layer 30 and the body 50 of porous polymeric material.

The outer side surface 88 of the body 50 of porous polymeric material includes an arcuately curving portion 102 which is disposed in engagement with the side wall portion 59 of the cover layer 34. A portion of the arcuately curving portion 102 of the outer side surface of the body 50 of porous polymeric material extends across the opening 52 in the cover layer 34. In addition, the outer side surface 88 of the body 50 of porous polymeric material includes an axially extending radially outer portion 104 which is disposed in engagement with the cylindrical radially outer portion 54 of the cover layer 34. Similarly, an axially extending radially inner portion 106 of the outer side surface 88 of the body 50 of porous polymeric material is disposed in engagement with the cylindrical radially inner portion 56 of the cover layer 34. The outer side surface 88 of the body 50 of porous polymeric material is bonded to the cover layer 34. Therefore, the body 50 of porous polymeric material is firmly held in place in the tube 18 by being bonded to both the reinforcing layer 30 and the cover layer 34.

The body 50 of porous polymeric material contains a large number of pores having an average micron pore size of approximately 130 and a pore volume of between 38% and 48% of the body 50. This allows fluid (air) to move sidewardly in and to pass through the body 50 without building up of excessive fluid pressure in the reinforcing layer 30. However, the body 50 of porous polymeric material is effective to block entry of most contaminants into the tube 18 to prevent exposure of the reinforcing plies 32 to the contaminants.

It is contemplated that many different types of material may be used to form the body 50 of porous polymeric material and it is not intended to limit the invention to any one specific material. However, in one specific embodiment of the invention, the body 50 of porous polymeric material was NYLON 6 which is commercially available from Porex Technologies of Fairbum, Ga. 30213, U.S.A. In this specific instance, the body 50 of porous polymeric material had the following characteristics:

| POROUS POLYMERIC MATERIAL | |
| --- | --- |
| Average micron pore size/test specimen | 130 |
| Pore volume (%) | 42.8 |
| Back pressure (cmH2O) | 10.0 |
| Air flow (ml/minute)/in. sq. | 8,000 |
| Tensile strength (psi) | 904.17 |
| Published tensile strength (solid part) (psi) | 12,200 |
| Elongation (inches before break) | 0.80 |
| Stiffness (degrees) | 8.27 |
| Point compression (inches) | .00204 |
| Melting range °C. | 189.3–225.2 |
| Crystallization range °C. | 148.9–184.7 |
| Thermal weight stability °C. | 321.13 |
| Heat deflection temp. °C. (264 lb./in. sq.) | 62.0 |
| Heat deflection temp. solid part °C. (264 lb./in. sq.) | 66.0 |
| Softening point °C. | 194.43 |
| Thermal expansion °C. (in./in.) | 0.0002882 |
| Published Thermal expansion °C. (solid part) (in./in.) | 0.000045 |

Although it is contemplated that materials other than the specific material set forth above may be used to form the body 50 of porous polymeric material, it is believed to be particularly advantageous to form the body 50 of porous polymeric material with an average micron pore size of approximately 130 and a pore volume of between 38% and 48%.

In the embodiment of the invention illustrated in FIGS. 1–3, there is a gap in the cover layer 34 where the opening 52 is formed. The body 50 of porous polymeric material does not fill the opening 52 in the cover layer 34. However, it is contemplated that the body 50 of porous polymeric material could project outwardly into the opening 52 to completely fill the opening in the cover layer 34.

In the embodiment of the invention shown in FIGS. 1-3, there are a plurality of bodies 50 of porous polymeric material in each of the side walls 44 and 46 of the tube 18. However, it is contemplated that a single, annular body 50 of porous polymeric material could be formed as a strip and placed in the side wall 44. This annular body 50 of porous polymeric material could have a cross section which is the same as shown in FIG. 2. If desired, the annular body 50 of porous polymeric material could have a continuous, annular outer side surface which is exposed to the environment around the tube 18. Of course, a second annular body 50 of porous polymeric material could be located in the side wall 46. It is also contemplated that the body 50 of porous polymeric material could be formed as the outer ply of the reinforcing layer 30.

Inflatable Tube - Second Embodiment

In the embodiment of the invention illustrated in FIGS. 1-3, there is a possibility that liquid or gaseous contaminants may pass through the body 50 of porous polymeric material to the reinforcing layer 30 when the coupling assembly component 10 is utilized in a very adverse environment. In the embodiment of the invention illustrated in FIG. 4, a vent valve assembly is provided at each of the vent openings in the side walls of the tube to block fluid flow through the vent openings. Since many of the components of the embodiment of the invention illustrated in FIG. 4 are similar to components of the embodiment of the invention illustrated in FIGS. 1-3, similar numerals will be utilized to designate similar components, the suffix letter "a" being associated with the numerals of FIG. 4 to avoid confusion.

Figure 4:
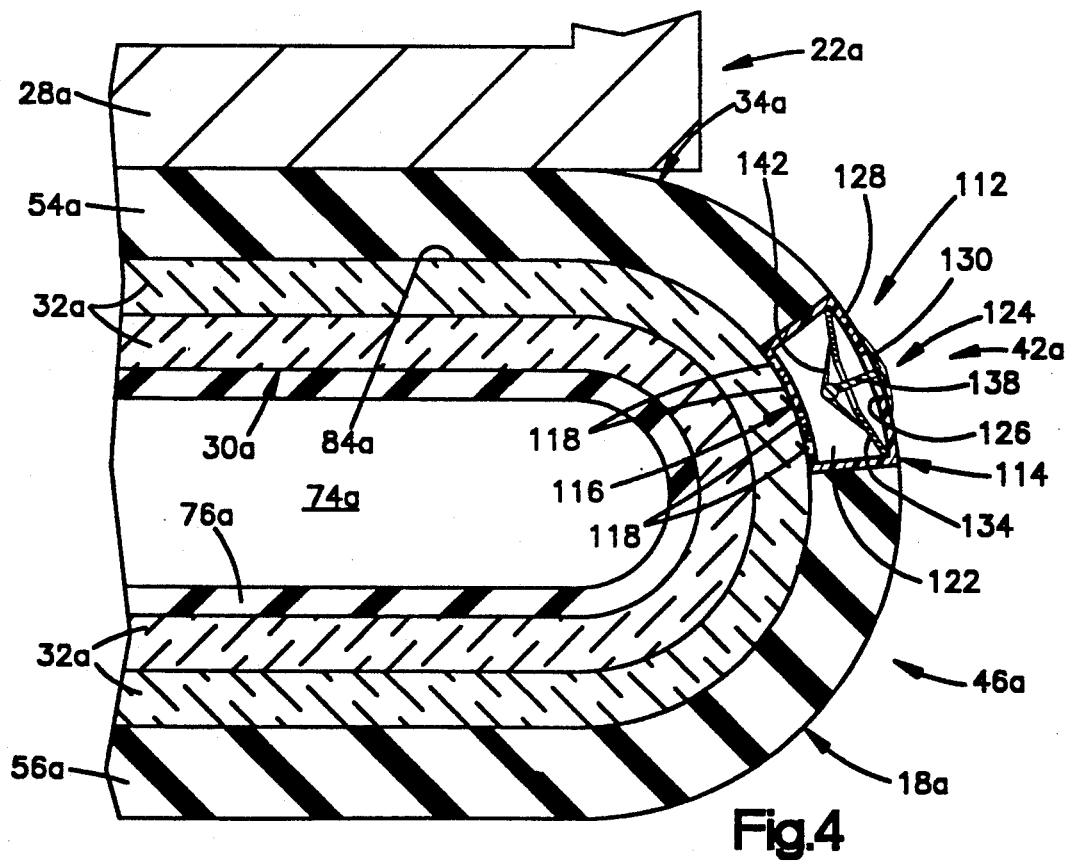
FIG. 4 is an enlarged fragmentary sectional view, generally similar to FIG. 3, of a second embodiment of the tube and in which a vent valve assembly is provided in the tube.

In the embodiment of the invention illustrated in FIG. 4, a vent valve assembly 112 is disposed in the vent opening 42a. The vent valve assembly 112 includes a circular metal housing 114 which is bonded to the cover layer 34a. The housing 114 has a circular inner wall 116 disposed in abutting engagement with and bonded to the outer side surface 84a of the reinforcing layer 30a. A plurality of holes or openings 118 are formed in the inner wall 116 of the housing 114 to enable air to flow from the reinforcing layer 30a into a chamber 122 in the housing. A vent valve 124 is provided to control fluid flow through a circular opening 126 formed in an outer wall 128 of the housing 114. The vent valve 124 includes a circular valve member 130 which is urged into sealing engagement with a circular outer wall 128 of the housing 114 by an annular Belleville type spring washer 134.

To enable the annular spring washer 134 to urge the valve member 130 to the closed position shown in FIG. 4, a stem 138 is connected with the center of the valve member 130 and extends through the opening 126 in the housing wall 128 and through a circular opening in the central portion of the annular spring washer 134. A plurality of arms 142 extend radially outwardly from the inner end of the stem 138 and engage the side of the spring washer 134 opposite from the opening 126. The pressure applied by the spring washer 134 against the arms 142 pulls the vent valve member 130 into sealing engagement with the outer wall 128 of the housing 114.

Upon building up of fluid (air) pressure in the reinforcing layer 30a, the fluid flows through the openings 118 into the valve housing chamber 122. When a predetermined pressure has been built up in the housing chamber 122, the vent valve member 130 is moved away from the outer wall 126 of the housing 128 to vent the chamber 122 and the reinforcing layer 30a to the atmosphere. The vent valve member 130 remains in the open position until the fluid pressure in the reinforcing layer 30a and housing chamber 122 has been reduced to a predetermined desired maximum pressure.

Only a single vent valve assembly 112 has been shown in FIG. 4. However, it should be understood that a plurality of identical vent valve assemblies 112 are provided at evenly spaced apart locations in the side wall 46a. It should also be understood that a plurality of vent valve assemblies 112 are provided in the opposite side wall of the tube 18a.

Although a specific vent vale assembly 112 has been shown in FIG. 4, it is contemplated that the vent valve assembly could have a different construction if desired. Thus, a flexible valve flap or member could be provided directly over the holes 118 in the inner wall 116 of the housing 114. A light spring contained within the housing 114 would bias the flap type valve toward the closed position. Of course, the vent valve assembly 112 could have still other constructions.

In the embodiment of the invention shown in FIGS. 3 and 4, exposure of the reinforcing layer 30 to contaminants from the environment around the tube is blocked by either the body 50 of porous polymeric material (FIG. 3) or the vent valve assembly 112 (FIG. 4). However, it is contemplated that it may be preferred to expose the reinforcing layer 30 directly to the environment through the vent opening 42. If this was done, a vent opening would be formed in the cover layer 34 and would extend through the cover layer to the reinforcing layer 30. The vent opening could be formed in the cover layer 34 by carefully drilling through the cover layer to the reinforcing layer 30 without damaging the reinforcing layer. Of course, other means of forming the vent opening could be utilized. For example, suitable cores could be provided to enable the vent opening to the molded into the cover layer 34 during forming of the cover layer. These cores would then be removed to form a vent opening which extends through the cover layer to the reinforcing layer 30.

Conclusion

The present invention provides a new and improved component 12 for use in a coupling assembly to transmit force between first and second elements, that is, an element connected to the rim 26 and a drum. The coupling assembly component 12 includes an annular tube 18 which is radially extensible and retractable in response to the conducting of fluid pressure into and out of the tube. This moves a first friction surface 70 into engagement with a second friction surface (not shown). The tube 18 includes a reinforcing layer 30 and a cover layer 34. The cover layer 34 is formed of an elastomeric material and extends around the reinforcing layer 30.

In accordance with a feature of the invention, a plurality of vent openings 42 extend through the cover layer 34 to the reinforcing layer 30. In one embodiment of the invention, the vent openings 42 are at least partially formed in a body 50 of porous polymeric material. In another embodiment of the invention (FIG. 4), vent valve assemblies 112 are associated with the vent openings 42a. Each of the vent valve assemblies 112 is operable between a closed condition blocking fluid flow through the vent openings 42a and an open condition enabling fluid to flow through the vent openings.

Having described the invention, the following is claimed:

1. A coupling assembly component for use in a coupling assembly to transmit force between first and second elements, said coupling assembly component comprising an annular base adapted to be connected with the first element, first annular friction surface means which is coaxial with said base and is movable into engagement with a second annular friction surface means connected with the second element, and annular tube means which is coaxial with said base and is radially extensible and retractable in response to the conducting of fluid pressure into and out of said tube means to move said first friction surface means into and out of engagement with the second friction surface means, said annular tube means including a reinforcing layer, a cover layer, said cover layer extending around said reinforcing layer, bodies of porous polymeric material disposed in said cover layer, and a plurality of vent openings extending through said cover layer to said reinforcing layer, said plurality of vent openings being at least partially formed in said bodies of porous polymeric material.

2. A coupling assembly component as set forth in claim 1 wherein each of said bodies of porous polymeric material has an inner side exposed to said reinforcing layer and an outer side which is exposed to atmosphere around said coupling.

3. A coupling assembly component as set forth in claim 1 wherein each of said bodies of porous polymeric material has an inner side which is disposed in engagement with and bonded to said reinforcing layer and an outer side which is disposed in engagement with and bonded to said cover layer.

4. A coupling assembly component as set forth in claim 1 wherein each of said bodies of porous polymeric material has an inner side which is disposed in engagement with said reinforcing layer and an outer side, a first portion of said outer side of each of said bodies of porous polymeric material being overlapped by said cover layer and a second portion of said outer side of each of said bodies of porous polymeric material being exposed to atmosphere around said coupling.

5. A coupling assembly component as set forth in claim 1 wherein each of said bodies of porous polymeric material has an average micron pore size of approximately 130 and a pore volume of between 38 and 48 percent.

6. A coupling assembly component as set forth in claim 1 wherein said annular tube means includes a first radially extending side wall portion which extends transversely to said first and second annular friction surface means and a second radially extending side wall portion which extends transversely to said first and second annular friction surface means and is disposed on a side of said tube means opposite from said first radially extending side wall portion, a first plurality of said bodies of porous polymeric material being disposed in said first radially extending side wall portion and a second plurality of said bodies of porous polymeric material being disposed in said second radially extending side wall portion.

7. A coupling assembly component as set forth in claim 1 wherein said cover layer is bonded to portions of each of said bodies of porous polymeric material to interconnect said cover layer and said bodies of porous polymeric material.

8. A coupling assembly component as set forth in claim 1 wherein said annular tube means includes a first radially extending side wall portion which extends transversely to said first and second annular friction surface means and a second radially extending side wall portion which extends transversely to said first and second annular friction surface means and is disposed on a side of said tube means opposite from said first radially extending side wall portion, one of said bodies of porous polymeric material being disposed in said first radially extending side wall portion and one of said bodies of porous polymeric material being disposed in said second radially extending side wall portion.

9. A coupling assembly component as set forth in claim 1 wherein said cover layer includes a generally cylindrical radially inner portion, a generally cylindrical radially outer portion, and first and second side wall portions interconnecting said radially inner and outer portions of said cover layer, said reinforcing layer including a generally cylindrical radially inner portion which is disposed radially outwardly of said radially inner portion of said cover layer and is bonded to said cover layer, a generally cylindrical radially outer portion which is disposed radially inwardly of said radially outer portion of said cover layer and is bonded to said radially outer portion of said cover layer, and first and second side wall portions interconnecting said radially inner and outer portions of said reinforcing layer, each of said bodies or porous polymeric material being partially disposed between said radially inner portion of said cover layer and said radially inner portion of said reinforcing layer, each of said bodies of porous polymeric material being partially disposed between said radially outer portion of said cover layer and said radially outer portion of said reinforcing layer, each of said bodies of porous polymeric material extending across one of said side wall portions of said reinforcing layer.

10. A coupling assembly component as set forth in claim 1 wherein said cover layer includes a generally cylindrical radially inner portion, a generally cylindrical radially outer portion, said first and second side wall portions interconnecting said radially inner and outer portions of said cover layer, said reinforcing layer including a generally cylindrical radially inner portion which is disposed radially outwardly of said radially inner portion of said cover layer and is bonded to said cover layer, a generally cylindrical radially outer portion which is disposed radially inwardly of said radially outer portion of said cover layer and is bonded to said radially outer portion of said cover layer, and first and second side wall portions interconnecting said radially inner and outer portions of said reinforcing layer and bonded to said first and second side wall portions of said cover layer, each of said bodies of porous polymeric material being partially disposed between and bonded to said radially inner portion of said cover layer and said radially inner portion of said reinforcing layer, each of said bodies of porous polymeric material being partially disposed between and bonded to said radially outer portion of said cover layer and said radially outer portion of said reinforcing layer, each of said bodies of porous polymeric material being partially disposed between and bonded to one of said side wall portions of said cover layer and one of said side wall portions of said reinforcing layer.

11. A coupling assembly component as set forth in claim 1 wherein said annular tube means includes a first radially extending side wall portion which extends transversely to said first and second annular friction surface means and a second radially extending side wall portion which extends transversely to said first and second annular friction surface means and is disposed on a side of said tube means opposite from said first radially extending side wall portion, said bodies of porous polymeric material being disposed in said first radially extending side wall portion.

12. A coupling assembly component for use in a coupling assembly to transmit force between first and second elements, said coupling assembly component comprising an annular base adapted to be connected with the first element, first annular friction surface means which is coaxial with said base and is movable into engagement with a second annular friction surface means connected with the second element, and annular tube means which is coaxial with said base and is radially extensible and retractable in response to the conducting of fluid pressure into and out of said tube means to move said first friction surface means into and out of engagement with the second friction surface means, said annular tube means including a reinforcing layer, a cover layer, said cover layer extending around said reinforcing layer, a body of porous polymeric material at least partially disposed between said cover and reinforcing layers, and a plurality of vent openings extending through said cover layer to said reinforcing layer, at least some of the vent openings of said plurality of vent openings being at least partially disposed in said body of porous polymeric material.

13. A coupling assembly component as set forth in claim 12 wherein said body of porous polymeric material has an inner side which is exposed to said reinforcing layer and an outer side which is partially exposed to atmosphere around said coupling and is partially cover by said cover layer.

14. A coupling assembly component as set forth in claim 12 wherein said body of porous polymeric material has an average micron pore size of approximately 130 and a pore volume of between 38 and 48 percent.

15. A coupling assembly component as set forth in claim 12 wherein said cover layer includes a generally cylindrical radially inner portion, a generally cylindrical radially outer portion, said first and second side wall portions interconnecting said radially inner and outer portions of said cover layer, said reinforcing layer including a generally cylindrical radially inner portion which is disposed radially outwardly of said radially inner portion of said cover layer, a generally cylindrical radially outer portion which is disposed radially inwardly of said radially outer portion of said cover layer, and first and second side wall portions interconnecting said radially inner and outer portions of said reinforcing layer, said body of porous polymeric material being partially disposed between said radially inner portion of said cover layer and said radially inner portion of said reinforcing layer, said body of porous polymeric material being partially disposed between said radially outer portion of said cover layer and said radially outer portion of said reinforcing layer, said body of porous polymeric material extending across at least one of said side wall portions of said reinforcing layer.

16. A coupling assembly component as set forth in claim 12 wherein said cover layer includes a generally cylindrical radially inner portion, a generally cylindrical radially outer portion, said first and second side wall portions interconnecting said radially inner and outer portions of said cover layer, said reinforcing layer including a generally cylindrical radially inner portion which is disposed radially outwardly of said radially inner portion of said cover layer, a generally cylindrical radially outer portion which is disposed radially inwardly of said radially outer portion of said cover layer, and first and second side wall portions interconnecting said radially inner and outer portions of said reinforcing layer, said body of porous polymeric material being partially disposed between and bonded to said radially inner portion of said cover layer and said radially inner portion of said reinforcing layer, said body of porous polymeric material being partially disposed between and bonded to said radially outer portion of said cover layer and said radially outer portion of said reinforcing layer, said body of porous polymeric material being partially disposed between and bonded to at least one of said side wall portions of said cover layer and at least one of said side wall portions of said reinforcing layer.

17. A coupling assembly component for use in a coupling assembly to transmit force between first and second elements, said coupling assembly component comprising an annular base adapted to be connected with the first element, first annular friction surface means which is coaxial with said base and is movable into engagement with a second annular friction surface means connected with the second element, and annular tube means which is coaxial with said base and is radially extensible and retractable in response to the conducting of fluid pressure into and out of said tube means to move said first friction surface means into and out of engagement with the second friction surface means, said annular tube means including a reinforcing layer, a cover layer, said cover layer extending around said reinforcing layer, a plurality of vent openings extending through said cover layer to said reinforcing layer, a plurality of vent valves each of which is operable between a closed condition blocking flow through one of said vent openings and an open condition enabling flow through said one of said vent openings.

18. A coupling assembly component as set forth in claim 17 wherein each one of said vent valves includes a valve seat mounted on said cover layer and a valve member, said valve member being disposed in abutting engagement with said valve seat when said one vent valve is in the closed condition, said valve member being spaced from said valve seat when said one vent valve is in the open condition.

19. A coupling assembly component as set forth in claim 17 wherein said annular tube means includes a first radially extending side wall portion which extends transversely to said first and second annular friction surface means and a second radially extending side wall portion which extends transversely to said first and second annular friction surface means and is disposed on a side of said annular tube means opposite from said first radially extending side wall portion, at least one of said vent valves being disposed in said first radially extending side wall portion and at least one of said vent valves being disposed in said second radially extending side wall portion.

20. A coupling assembly component as set forth in claim 17 wherein each of said vent valves includes a housing which is mounted in said cover layer and a valve member in said housing, said housing having an inner side wall in which a plurality of openings are formed, said inner side wall of said housing being disposed adjacent to said reinforcing layer, said valve member preventing fluid flow through said plurality of openings when said valve means is in the closed condition.

21. A coupling assembly component for use in a coupling assembly having an annular base adapted to be connected with a first element and a first annular friction surface which is coaxial with said base and is movable into engagement with a second annular friction surface connected with a second element, said coupling assembly component comprising annular fluid extensible tube means which is extensible under the influence of fluid pressure in a chamber in said tube means to move the first friction surface into engagement with the second friction surface, said annular friction extensible tube means including a reinforcing layer, a cover layer, said cover layer extending over and disposed in engagement with said reinforcing layer, a body of porous polymeric material at least partially disposed in engagement with said reinforcing layer and said cover layer, and a plurality of vent openings extending through said cover layer to said reinforcing layer, at least some of said plurality of vent openings being at least partially formed in said body of porous polymeric material.

22. A coupling assembly component as set forth in claim 21 wherein said body of porous polymeric material has an inner side exposed to said reinforcing layer and an outer side which is exposed to atmosphere around said coupling assembly component.

23. A coupling assembly component as set forth in claim 21 wherein said body of porous polymeric material has an inner side which is disposed in engagement with and bonded to said reinforcing layer and an outer side which is disposed in engagement with and bonded to said cover layer.

24. A coupling assembly component as set forth in claim 21 wherein said body of porous polymeric material has an inner side which is disposed in engagement with said reinforcing layer and an outer side, a first portion of said outer side of said body of porous polymeric material being overlapped by said cover layer and a second portion of said outer side of said body of porous polymeric material being exposed to atmosphere around said coupling assembly component.

25. A coupling assembly component as set forth in claim 21 wherein said body of porous polymeric material has an average micron pore size of approximately 130 and a pore volume of between 38 and 48 percent.

26. A coupling assembly component as set forth in claim 21 wherein said cover layer includes a generally cylindrical radially inner portion, a generally cylindrical radially outer portion, and first and second side wall portions interconnecting said radially inner and outer portions of said cover layer, said reinforcing layer including a generally cylindrical radially inner portion which is disposed radially outwardly of said radially inner portion of said cover layer and is bonded to said cover layer, a generally cylindrical radially outer portion which is disposed radially inwardly of said radially outer portion of said cover layer and is bonded to said radially outer portion of said cover layer, and first and second side wall portions interconnecting said radially inner and outer portions of said reinforcing layer, said body of porous polymeric material being partially disposed between said radially inner portion of said cover layer and said radially inner portion of said reinforcing layer, said body of porous polymeric material being partially disposed between said radially outer portion of said cover layer and said radially outer portion of said reinforcing layer, said body of porous polymeric material extending across one of said side wall portions of said reinforcing layer.

27. A coupling assembly component for use in a coupling assembly having an annular base adapted to be connected with a first element and a first annular friction surface which is coaxial with said base and is movable into engagement with a second annular friction surface connected with a second element, said coupling assembly component comprising annular fluid extensible tube means which is extensible under the influence of fluid pressure in a chamber in said tube means to move the first friction surface into engagement with the second friction surface, said annular fluid extensible tube means including a reinforcing layer, a cover layer, said cover layer extending over and disposed in engagement with said reinforcing layer, a plurality of vent openings extending through said cover layer to said reinforcing layer, and a plurality of vent valves connected with said cover layer, each of said vent valves being operable between a closed condition blocking flow through one of said vent openings and an open condition enabling flow through said one of said vent openings.

28. A coupling assembly component as set forth in claim 27 wherein each one of said vent valves includes a valve seat mounted on said cover layer and a valve member, said valve member being disposed in abutting engagement with said valve seat when said one vent valve is in the closed condition, said valve member being spaced from said valve seat when said one vent valve is in the open condition.

29. A coupling assembly component as set forth in claim 27 wherein said annular tube means includes a first radially extending side wall portion which extends transversely to said first and second annular friction surface means and a second radially extending side wall portion which extends transversely to said first and second annular friction surface means and is disposed on a side of said annular tube means opposite from said first radially extending side wall portion, at least one of said vent valves being disposed in said first radially extending side wall portion and at least one of said vent valves being disposed in said second radially extending side wall portion.

30. A coupling assembly component as set forth in claim 27 wherein each of said vent valves includes a housing which is mounted in said cover layer and a valve member in said housing, said housing having an inner side wall in which a plurality of openings are formed, said inner side wall of said housing being disposed adjacent to said reinforcing layer, said valve member preventing fluid flow through said plurality of openings when said valve means is in the closed condition.

* * * * *

UNITED STATES PATENT AND TRADEMARK OFFICE
CERTIFICATE OF CORRECTION

PATENT NO. : 5,230,414
DATED : July 27, 1993
INVENTOR(S) : Ronald W. Diesch

It is certified that error appears in the above-indentified patent and that said Letters Patent is hereby corrected as shown below:

Column 10, line 26, change "or" to --of--.

Column 11, line 32, change "cover" to --covered--.

Signed and Sealed this

Fifth Day of April, 1994

Attest:

BRUCE LEHMAN

Attesting Officer    Commissioner of Patents and Trademarks